United States Patent [19]
Baumert et al.

[11] Patent Number: 5,676,911
[45] Date of Patent: Oct. 14, 1997

[54] RADIAL FLOW FUEL PROCESSOR

[75] Inventors: Robert M. Baumert, Vancouver; Danny G. Epp, Tsawwassen; Eddy J. Peters, New Westminster, all of Canada

[73] Assignee: Her Majesty the Queen in right of Canada, as represented by the Minister of National Defence of Her Majesty's Canadian Government, Canada

[21] Appl. No.: 572,654

[22] Filed: Dec. 14, 1995

[51] Int. Cl.[6] .................................................. F28D 7/00
[52] U.S. Cl. .................... 422/200; 422/192; 422/198; 422/218; 165/164; 165/168; 429/120
[58] Field of Search .................................... 422/198, 192, 422/200, 218; 165/154, 164, 168, 170, 110; 429/19, 120

[56] References Cited

U.S. PATENT DOCUMENTS

| | | | |
|---|---|---|---|
| 4,321,234 | 3/1982 | Ohsaki et al. | 422/200 |
| 5,249,624 | 10/1993 | Pow et al. | 165/110 |
| 5,273,106 | 12/1993 | Drake | 165/96 |
| 5,334,357 | 8/1994 | Benton et al. | 422/197 |
| 5,366,699 | 11/1994 | Milfeld et al. | 422/169 |
| 5,405,586 | 4/1995 | Koves | 422/218 |

Primary Examiner—Christopher Kim
Attorney, Agent, or Firm—McAndrews, Held & Malloy, Ltd.

[57] ABSTRACT

A radial flow fuel processor comprises a heat transfer assembly and a reactor housing encasing the heat transfer assembly. The heat transfer assembly includes a plate having a plurality of heat transfer structures extending therefrom and at least one fluid passageway extending within the heat transfer plate for containing a heat transfer fluid stream. The reactor housing comprises a an inlet and an outlet. A reactant stream introduced at the inlet flows radially outwardly through the processing chamber to the volume between the housing and the heat transfer assembly, and is then exhausted through the outlet. In reverse mode, a reactant stream introduced at the outlet flows radially inwardly through volume between the housing and the heat transfer assembly to the processing chamber, and is then exhausted through the inlet.

61 Claims, 7 Drawing Sheets

RADIAL FLOW FUEL PROCESSOR

FIELD OF THE INVENTION

This invention relates generally to a fuel processor suitable for facilitating catalytic and non-catalytic processes which are heat transfer driven. Specifically, this invention provides a fuel processor capable of transferring large amounts of heat to or from the process fluids in a limited reactor volume. The processor is particularly suited for use as a vaporizer and as a methanol reformer to produce a hydrogen-containing reformate fuel stream for an electrochemical fuel cell.

BACKGROUND OF THE INVENTION

Many chemical and physical processes are limited by the amount of heat that can be delivered to or removed from the process fluids. An example of a process limited by the heat transfer characteristics of a reactor is the heating or cooling of a fluid in a heat exchanger. The amount of heat that can be removed from or transferred to a fluid in a heat exchanger is affected by a number of system characteristics, such as, for example, flow rates, heat transfer coefficients, heat exchanger geometry, and the thermal conductivity of the heat exchanger components.

Designers of heat exchangers, reactors and other reactant processors are often restricted by space limitations and flow rate demands when designing such processors for particular applications. Therefore, it is often a goal to maximize heat transfer at a given flow rate, while minimizing the space required to accommodate the processor. This is particularly a concern with regard to portable or mobile units or instances in which space is limited.

Catalytic fuel reformers convert fuels, such as natural gas, light distillates, methanol, propane, naphtha, and kerosene to a hydrogen rich reformate. Low temperature steam reformers for methanol require vaporization and preheating of a methanol water mixture prior to feeding the mixture to the reformer and exposing it to the reformer catalyst. Such applications require a vaporizer which provides a large flow of vapor at temperatures from about 200° C. to about 300° C., depending upon the pressure and catalyst employed, in a limited vaporizer volume. To accommodate the large flow of vapor necessary to supply the reformer, the vaporizer must operate at a very high heat flux.

Prior art vaporizers, such as, for example, the vaporizer disclosed in U.S. Pat. No. 5,249,624, are adequate for many applications. However, some applications require a more compact vaporizer capable of high flow rates, with rapid response to changing output demand, and high heat flux. Like vaporizers, low temperature catalytic reformers are often heat transfer limited.

Importantly, observation reveals that the capacity of a catalytic reformer to produce hydrogen rich gas is typically not limited by the volume of the catalyst bed, but rather by the amount of heat transferred to the catalyst bed to support the endothermic reforming reaction. If heat transfer is improved within a given reactor geometry, then the hydrogen production rate per unit volume of reactor space is likely to increase significantly.

Therefore, it is an object of the present invention to provide a reactor, suitable for use with or without a catalyst, in which heat transfer to the reactor space is promoted.

It is another object of the present invention to provide a reactor suitable for use as a vaporizer that is capable of accommodating high reactant flow rates, with quick response to changing output demands, and with improved heat flux.

It is yet another object of the present invention to provide a reactor suitable for use as a catalytic reformer which promotes heat transfer to the catalyst bed for a given reactor volume, thereby increasing the output of hydrogen rich reformate gas.

SUMMARY OF THE INVENTION

The above and other objects are achieved by a radial flow reactor comprising:

(a) a heat transfer assembly comprising:
  (1) a heat transfer plate having two oppositely facing major surfaces and an opening formed in the central portion thereof, at least one of the heat transfer plate major surfaces having a plurality of heat transfer structures extending therefrom, and at least one fluid passageway extending within the heat transfer plate in the volume between the two major surfaces, the at least one passageway comprising an inlet for introducing a heat transfer fluid stream into the passageway and an outlet for directing the heat transfer fluid stream away from the passageway; and
  (2) a sealing plate having two oppositely facing major surfaces, one of the sealing plate major surfaces contacting at least a portion of the plurality of heat transfer structures, the sealing plate and the heat transfer plate cooperating to form a reaction chamber therebetween;
(b) a reactor housing encasing the heat transfer assembly, the reactor housing comprising a reactant stream inlet and a reactant stream outlet;
(c) means for directing a reactant stream introduced at the reactant stream inlet to the reaction chamber; and
(d) means for directing the reactant stream from the reaction chamber to the reactant stream outlet.

In the preferred reactor, the means for directing a reactant stream introduced at the reactant stream inlet to the reaction chamber is a conduit in fluid communication with the heat transfer plate opening. The conduit fluidly interconnects the reactant stream inlet and the reaction chamber. The means for directing the reactant stream from the reaction chamber to the reactant stream outlet is the volume formed between the reactor housing and the heat transfer assembly. The volume fluidly interconnects the reaction chamber and the reactant stream outlet.

In reverse mode, the means for directing a reactant stream introduced at the reactant stream inlet to the reaction chamber is the volume formed between the reactor housing and the heat transfer assembly. The means for directing the reactant stream from the reaction chamber to the reactant stream outlet is a conduit in fluid communication with the heat transfer plate opening.

The plurality of heat transfer structures is preferably arranged in a plurality of concentric circular rows. The plurality of heat transfer structures can also be arranged in a spiral pattern. Preferably there is no radial, straight-line path between the heat transfer structures. The plurality of heat transfer structures preferably comprises a plurality of cylindrical pins. The plurality of heat transfer structures can also comprise a plurality of fins.

The at least one fluid passageway preferably comprises a coiled tube.

When the reactor is employed to facilitate a catalytic reaction, such as, for example, steam reformation of a fuel like methanol, the reactor preferably further comprises a quantity of catalyst disposed within the reaction chamber, the catalyst promoting steam reformation of the fuel.

In another reactor embodiment, a radial flow reactor comprises:

(a) a heat transfer assembly comprising:
   (1) a heat transfer plate having oppositely facing first and second major surfaces and an opening formed in the central portion thereof, each of the first and second heat transfer plate major surfaces having a plurality of heat transfer structures extending therefrom, at least one fluid passageway extending within the heat transfer plate in the volume between the two major surfaces, the at least one fluid passageway comprising an inlet for introducing a heat transfer fluid stream into the passageway and an outlet for directing the heat transfer fluid stream away from the passageway; and
   (2) a first sealing plate having two oppositely facing major surfaces, one of the first sealing plate major surfaces contacting at least a portion of the plurality of heat transfer structures extending from the first heat transfer plate major surface, the first sealing plate and the heat transfer plate cooperating to form a first reaction chamber therebetween;
   (3) a second sealing plate having two oppositely facing major surfaces, one of the second sealing plate major surfaces contacting at least a portion of the plurality of heat transfer structures extending from the second heat transfer plate major surface, the second sealing plate and the heat transfer plate cooperating to form a second reaction chamber therebetween;
(b) a reactor housing encasing the heat transfer assembly, the reactor housing comprising a reactant stream inlet and a reactant stream outlet;
(c) means for directing a reactant stream introduced at the reactant stream inlet to each of the first and second reaction chambers; and
(d) means for directing the reactant stream from each of the first and second reaction chambers to the reactant stream outlet.

A radial flow vaporizer comprises:
(a) a heat transfer assembly comprising:
   (1) a heat transfer plate having two oppositely facing major surfaces and an opening formed in the central portion thereof, at least one of the heat transfer plate major surfaces having a plurality of heat transfer structures extending therefrom, at least one fluid passageway extending within the heat transfer plate in the volume between the two major surfaces, the at least one fluid passageway comprising an inlet for introducing a heat transfer fluid stream into the passageway and an outlet for directing the heat transfer fluid stream away from the passageway; and
   (2) a sealing plate having two oppositely facing major surfaces, one of the sealing plate major surfaces contacting at least a portion of the plurality of heat transfer structures, the sealing plate and the heat transfer plate cooperating to form a vaporization chamber therebetween;
(b) a vaporizer housing encasing the heat transfer assembly, the vaporizer housing comprising a reactant stream inlet and a reactant stream outlet;
(c) means for directing a reactant stream introduced at the reactant stream inlet to the vaporization chamber; and
(d) means for directing the reactant stream from the vaporization chamber to the reactant stream outlet.

In the preferred vaporizer, the means for directing a reactant stream introduced at the reactant stream inlet to the vaporization chamber is a conduit in fluid communication with the heat transfer plate opening. The conduit fluidly interconnects the reactant stream inlet and the vaporization chamber. The means for directing the reactant stream from the vaporization chamber to the reactant stream outlet is the volume formed between the vaporizer housing and the heat transfer assembly. The volume fluidly interconnects the vaporization chamber and the reactant stream outlet. The conduit preferably comprises a plurality of nozzles for introducing the reactant stream into the vaporization chamber.

The plurality of heat transfer structures is preferably arranged in a plurality of concentric circular rows. Each of the plurality of heat transfer structures has a distal edge, and the distance between the distal edge and the heat transfer plate preferably increases as the plurality of concentric circular rows is traversed radially outwardly from the central portion of the heat transfer plate. The plurality of heat transfer structures can also be arranged in a spiral pattern. Preferably there is no radial, straight-line path between the heat transfer structures. The plurality of heat transfer structures preferably comprises a plurality of pins. The plurality of heat transfer structures can also comprise a plurality of fins.

The at least one fluid passageway preferably comprises a coiled tube.

In another embodiment, a radial flow vaporizer comprises:
(a) a heat transfer assembly comprising:
   (1) a heat transfer plate having oppositely facing first and second major surfaces and an opening formed in the central portion thereof, each of the first and second heat transfer plate major surfaces having a plurality of heat transfer structures extending therefrom, at least one fluid passageway extending within the heat transfer plate in the volume between the two major surfaces, the at least one fluid passageway comprising an inlet for introducing a heat transfer fluid stream into the passageway and an outlet for directing the heat transfer fluid stream away from the passageway; and
   (2) a first sealing plate having two oppositely facing major surfaces, one of the first sealing plate major surfaces contacting at least a portion of the plurality of heat transfer structures extending from the first heat transfer plate major surface, the first sealing plate and the heat transfer plate cooperating to form a first vaporization chamber therebetween;
   (3) a second sealing plate having two oppositely facing major surfaces, one of the second sealing plate major surfaces contacting at least a portion of the plurality of heat transfer structures extending from the second heat transfer plate major surface, the second sealing plate and the heat transfer plate cooperating to form a second vaporization chamber therebetween;
(b) a vaporizer housing encasing the heat transfer assembly, the vaporizer housing comprising a reactant stream inlet and a reactant stream outlet;
(c) means for directing a reactant stream introduced at the reactant stream inlet to each of the first and second vaporization chambers; and
(d) means for directing the reactant stream from each of the first and second vaporization chambers to the reactant stream outlet.

A radial flow reactant processor comprises:
(a) a vaporizer heat transfer assembly comprising:

(1) a vaporizer heat transfer plate having two oppositely facing major surfaces and an opening formed in the central portion thereof, at least one of the vaporizer heat transfer plate major surfaces having a plurality of vaporizer heat transfer structures extending therefrom, at least one vaporizer fluid passageway extending within the vaporizer heat transfer plate in the volume between the two vaporizer heat transfer plate major surfaces, the at least one vaporizer fluid passageway comprising an inlet for introducing a heat transfer fluid stream into the vaporizer fluid passageway and an outlet for directing the heat transfer fluid stream away from the vaporizer fluid passageway; and (2) a vaporizer sealing plate having two oppositely facing major surfaces, one of the vaporizer sealing plate major surfaces contacting at least a portion of the plurality of vaporizer heat transfer structures, the vaporizer sealing plate and the vaporizer heat transfer plate cooperating to form a vaporization chamber therebetween;

(b) a reactor heat transfer assembly comprising:

(1) a reactor heat transfer plate having two oppositely facing major surfaces and an opening formed in the central portion thereof, at least one of the reactor heat transfer plate major surfaces having a plurality of reactor heat transfer structures extending therefrom, at least one reactor fluid passageway extending within the reactor heat transfer plate in the volume between the two reactor heat transfer plate major surfaces, the at least one reactor fluid passageway comprising an inlet for introducing a heat transfer fluid stream into the reactor fluid passageway and an outlet for directing the heat transfer fluid stream away from the reactor fluid passageway; and (2) a reactor sealing plate having two oppositely facing major surfaces, one of the reactor sealing plate major surfaces contacting at least a portion of the plurality of reactor heat transfer structures, the reactor sealing plate and the reactor heat transfer plate cooperating to form a reaction chamber therebetween;

(c) a processor housing encasing the vaporizer heat transfer assembly and the reactor heat transfer assembly, the processor housing comprising a reactant stream inlet and a reactant stream outlet;

(d) means for directing a reactant stream introduced at the reactant stream inlet to the vaporization chamber;

(e) means for directing the reactant stream from the vaporization chamber to the reaction chamber;

(f) means for directing the reactant stream from the reaction chamber to the reactant stream outlet.

In the preferred reactant processor, the means for directing a reactant stream introduced at the reactant stream inlet to the vaporization chamber is a first conduit extending through the vaporizer heat transfer plate opening and the reactor heat transfer plate opening. The conduit fluidly interconnects the reactant stream inlet and the vaporization chamber. The means for directing the reactant stream from the vaporization chamber to the reaction chamber is the volume formed between the processor housing and the vaporizer and reactor heat transfer assemblies. The volume fluidly interconnects the vaporization chamber and the reaction chamber. The means for directing the reactant stream from the reaction chamber to the reactant stream outlet is a second conduit extending through the vaporizer heat transfer plate opening and the reactor heat transfer plate opening.

The second conduit fluidly interconnects the reaction chamber and the reactant stream outlet. The first and second conduits are preferably concentrically disposed. The first conduit preferably comprises a plurality of nozzles for introducing the reactant stream into the vaporization chamber.

When the processor is employed to facilitate a catalytic reaction, such as, for example, steam reformation of a fuel like methanol, the processor preferably further comprises a quantity of catalyst disposed within the reaction chamber, the catalyst promoting steam reformation of the fuel.

In another embodiment, a radial flow reactant processor comprises:

(a) at least one vaporizer heat transfer assembly comprising:

(1) a vaporizer heat transfer plate having oppositely facing first and second major surfaces and an opening formed in the central portion thereof, each of the first and second vaporizer heat transfer plate major surfaces having a plurality of vaporizer heat transfer structures extending therefrom, at least one vaporizer fluid passageway extending within the vaporizer heat transfer plate in the volume between the two vaporizer heat transfer plate major surfaces, the at least one vaporizer fluid passageway comprising an inlet for introducing a heat transfer fluid stream into the passageway and an outlet for directing the heat transfer fluid stream away from the vaporizer fluid passageway; and (2) a first vaporizer sealing plate having two oppositely facing major surfaces, one of the first vaporizer sealing plate major surfaces contacting at least a portion of the plurality of vaporizer heat transfer structures extending from the first vaporizer heat transfer plate major surface, the first vaporizer sealing plate and the at least one vaporizer heat transfer plate cooperating to form a first vaporization chamber therebetween;

(3) a second vaporizer sealing plate having two oppositely facing major surfaces, one of the second sealing plate major surfaces contacting at least a portion of the plurality of heat transfer structures extending from the second heat transfer plate major surface, the second sealing plate and the heat transfer plate cooperating to form a second vaporization chamber therebetween;

(b) at least one reactor heat transfer assembly comprising:

(1) a reactor heat transfer plate having oppositely facing first and second major surfaces and an opening formed in the central portion thereof, each of the first and second reactor heat transfer plate major surfaces having a plurality of reactor heat transfer structures extending therefrom, at least one reactor fluid passageway extending within the reactor heat transfer plate in the volume between the two major reactor heat transfer plate surfaces, the at least one reactor fluid passageway comprising an inlet for introducing a heat transfer fluid stream into the passageway and an outlet for directing the heat transfer fluid stream away from the reactor fluid passageway; and (2) a first reactor sealing plate having two oppositely facing major surfaces, one of the first reactor sealing plate major surfaces contacting at least a portion of the plurality of reactor heat transfer structures extending from the first reactor heat transfer plate major surface, the first reactor sealing plate and the at least one reactor heat transfer plate cooperating to form a first reaction chamber therebetween;

(3) a second reactor sealing plate having two oppositely facing major surfaces, one of the second reactor sealing plate major surfaces contacting at least a portion of the plurality of reactor heat transfer structures extending from the second reactor heat transfer plate major surface, the second reactor sealing plate and the at least one reactor heat transfer plate cooperating to form a second reaction chamber therebetween;

(c) a processor housing encasing the at least one vaporizer heat transfer assembly and the at least one reactor heat transfer assembly, the processor housing comprising a reactant stream inlet and a reactant stream outlet;

(d) means for directing a reactant stream introduced at the reactant stream inlet to the first and second vaporization chambers;

(e) means for directing the reactant stream from the first and second vaporization chambers to the first and second reaction chambers;

(f) means for directing the reactant stream from the first and second reaction chambers to the reactant stream outlet.

In the preferred reactant processor, the at least one vaporizer heat transfer assembly is one vaporizer heat transfer assembly and the at least one reactor heat transfer assembly comprises a plurality of reactor heat transfer assemblies.

DETAILED DESCRIPTION OF THE PREFERRED EMBODIMENTS

Figure 1:
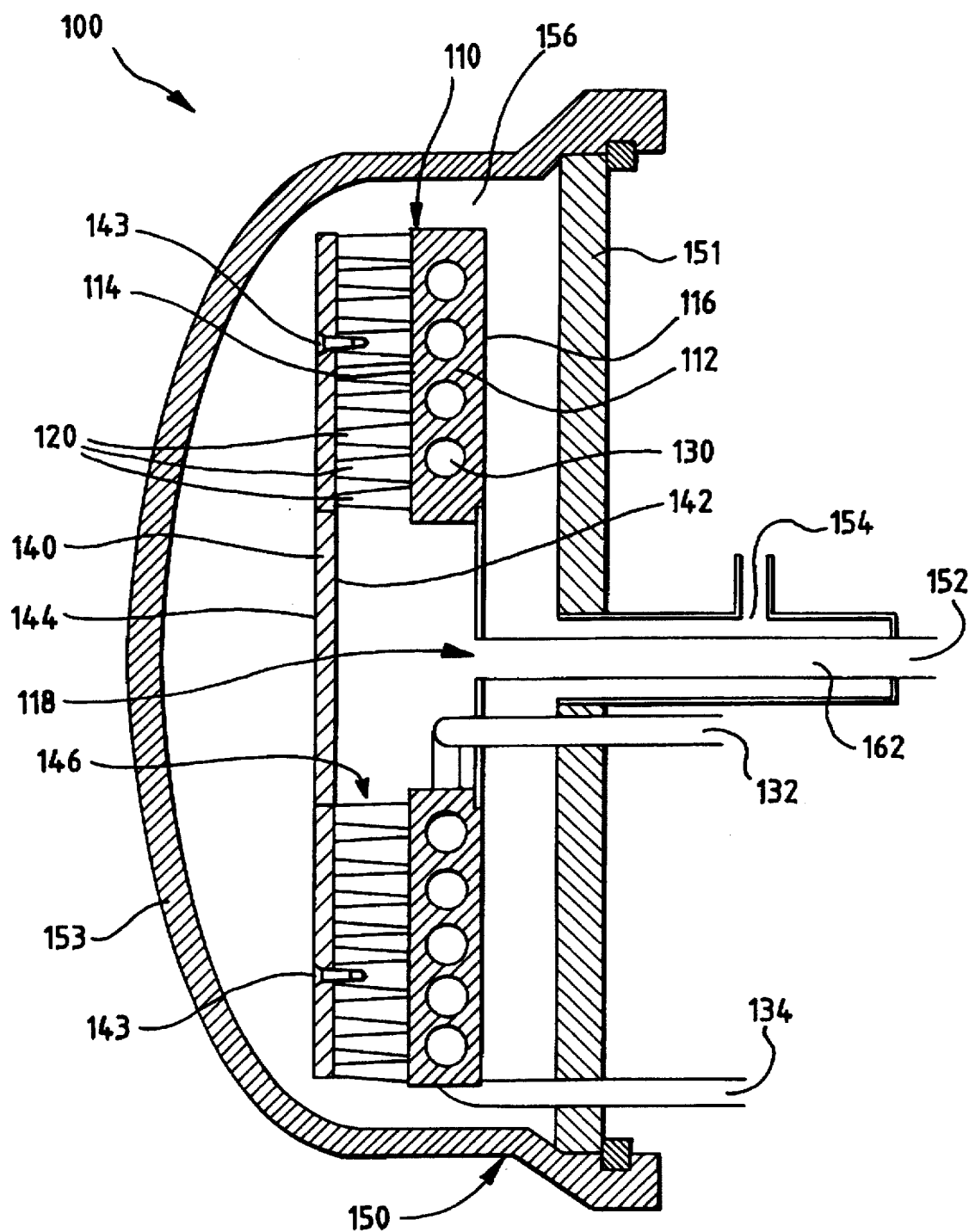
FIG. 1 is a side sectional view of a first embodiment of a radial flow reactor.

Turning first to FIG. 1, a radial flow reactor 100 includes a heat transfer assembly 110 and a reactor housing 150 encasing the heat transfer assembly 110. Heat transfer assembly 110 includes a heat transfer plate 112 having two oppositely facing major surfaces 114, 116 and an opening 118 formed in the central portion thereof. Heat transfer plate major surface 114 has a plurality of heat transfer structures 120 extending therefrom.

In reactor 100, the plurality of heat transfer structures 120 is arranged in a plurality of concentric circular rows. The plurality of heat transfer structures could also be arranged in a spiral pattern. Preferably there is no radial, straight-line path between the heat transfer structures 120. In FIG. 1, the plurality of heat transfer structures 120 is a plurality of cylindrical pins. The plurality of heat transfer structures 120 could also be a plurality of fins.

Heat transfer assembly 110 is preferably formed from cast metal, most preferably cast aluminum.

A fluid passageway 130 extends within heat transfer plate 112 in the volume between surfaces 114, 116. The passageway 130 includes an inlet 132 for introducing a heat transfer fluid stream into passageway 130 and an outlet 134 for directing the heat transfer fluid stream away from the passageway 130. Depending on the direction of reactant flow and the temperature profile required, the heat transfer fluid may be introduced into passageway 130 via outlet 134 and directed away from passageway 130 via inlet 132. Passageway 130 is preferably a coiled tube cast in place within the volume between major surfaces 114, 116 of heat transfer plate 112. Passageway 130 is also preferably corrugated or spiral-ribbed to promote heat transfer.

As shown in FIG. 1, a sealing plate 140 has two oppositely facing major surfaces 142, 144 Sealing plate major surface 142 contacts at least a portion of the plurality of heat transfer structures 120. Sealing plate 140 is preferably formed from metal, most preferably sheet aluminum. Sealing plate 140 is assembled to heat transfer assembly 110 by fasteners, shown in FIG. 1 as screws 143. Sealing plate 140 and heat transfer assembly 110 cooperate to form a reaction chamber 146 therebetween. In any of the embodiments described herein, the heat transfer assembly may optionally comprise a layer of gasketing material, such as compressible graphite foil, interposed between the sealing plate and the heat transfer structures.

The arrangement of the heat transfer pins 120 in concentric circular rows assures that a reactant stream flowing radially within reaction chamber 146 contacts at least one heat transfer pin before exiting reaction chamber 146. This arrangement prevents straight-line channelling of the reactant stream between the pins 120, and promotes even flow distribution.

Reactor housing 150 encases the heat transfer assembly 110. Reactor housing 150, as shown in FIG. 1, includes an end plate 151 and a bell-shaped cover 153, but housing 150 could also be formed by interposing a cylindrical shell between two end plates. End plate 151 is preferably formed from stainless steel. Reactor housing 150 includes a reactant stream inlet 152 and a reactant stream outlet 154.

Reactor 100 includes a conduit 162 in fluid communication with the heat transfer plate opening 118. Conduit 162 directs a reactant stream introduced at reactant stream inlet 152 to reaction chamber 146. Conduit 162 fluidly interconnects reactant stream inlet 152 and reaction chamber 146. The volume 156 formed between the reactor housing 150 and the heat transfer assembly 110 directs the reactant stream from the reaction chamber 146 to the reactant stream outlet 154. Volume 156 fluidly interconnects the reaction chamber 146 and the reactant stream outlet 154.

The radial flow of the reactant stream through reactor 100 can also be reversed from that described above. In reverse mode, the reactant stream is introduced at reactant stream outlet 154 and directed to reaction chamber 146 by the volume 156 formed between reactor housing 150 and heat transfer assembly 110. The reactant stream is then directed from reaction chamber 146 to reactant stream inlet 152 by conduit 162, which is in fluid communication with heat transfer plate opening 118.

When reactor 100 is employed to facilitate a catalytic reaction, such as, for example, steam reformation of a fuel like methanol, then reaction chamber 146 is preferably filled with a quantity of catalyst (not shown in FIG. 1).

In operation, a reactant stream introduced to reactor 100 through reactant stream inlet 152 and conduit 162 (or, in reverse mode, through reactant stream outlet 154 and volume 156) flows through reaction chamber 146. Reaction chamber 146 is heated or cooled through exchange of heat with the plurality of heat transfer structures 120, which are themselves heated or cooled by transfer of heat with a thermal fluid flowing in passageway 130. Once the reactant stream has participated in the physical or chemical process within reaction chamber 146, the reactant stream is exhausted from reactor 100 through volume 156 and reactant stream outlet 154 (or, in reverse mode, through conduit 162 and reactant stream inlet 152).

Figure 2:
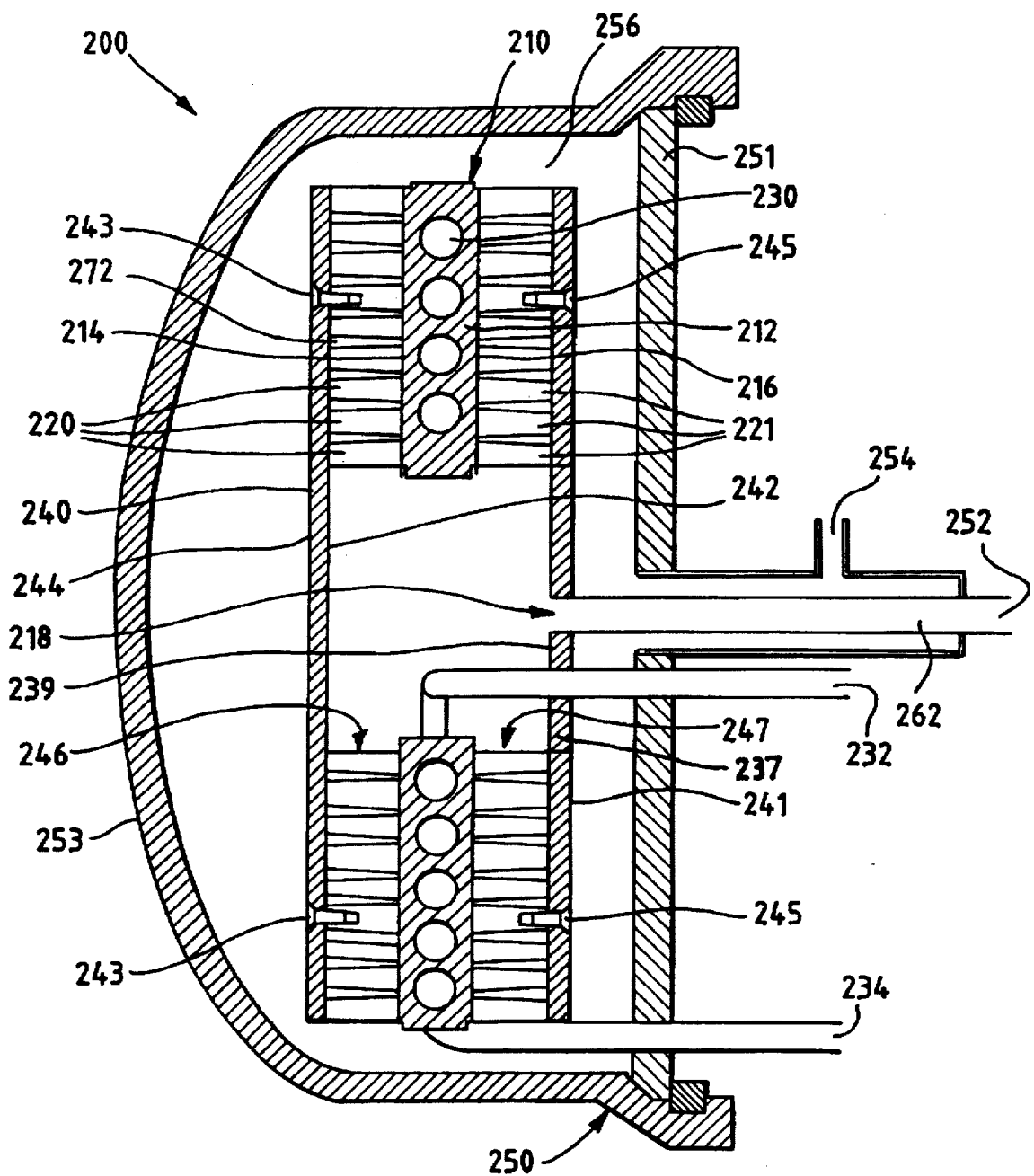
FIG. 2 is a side sectional view of a second embodiment of a radial flow reactor in which heat transfer is achieved by providing heat transfer structures extending from both sides of the heat transfer plate.
Figure 3:
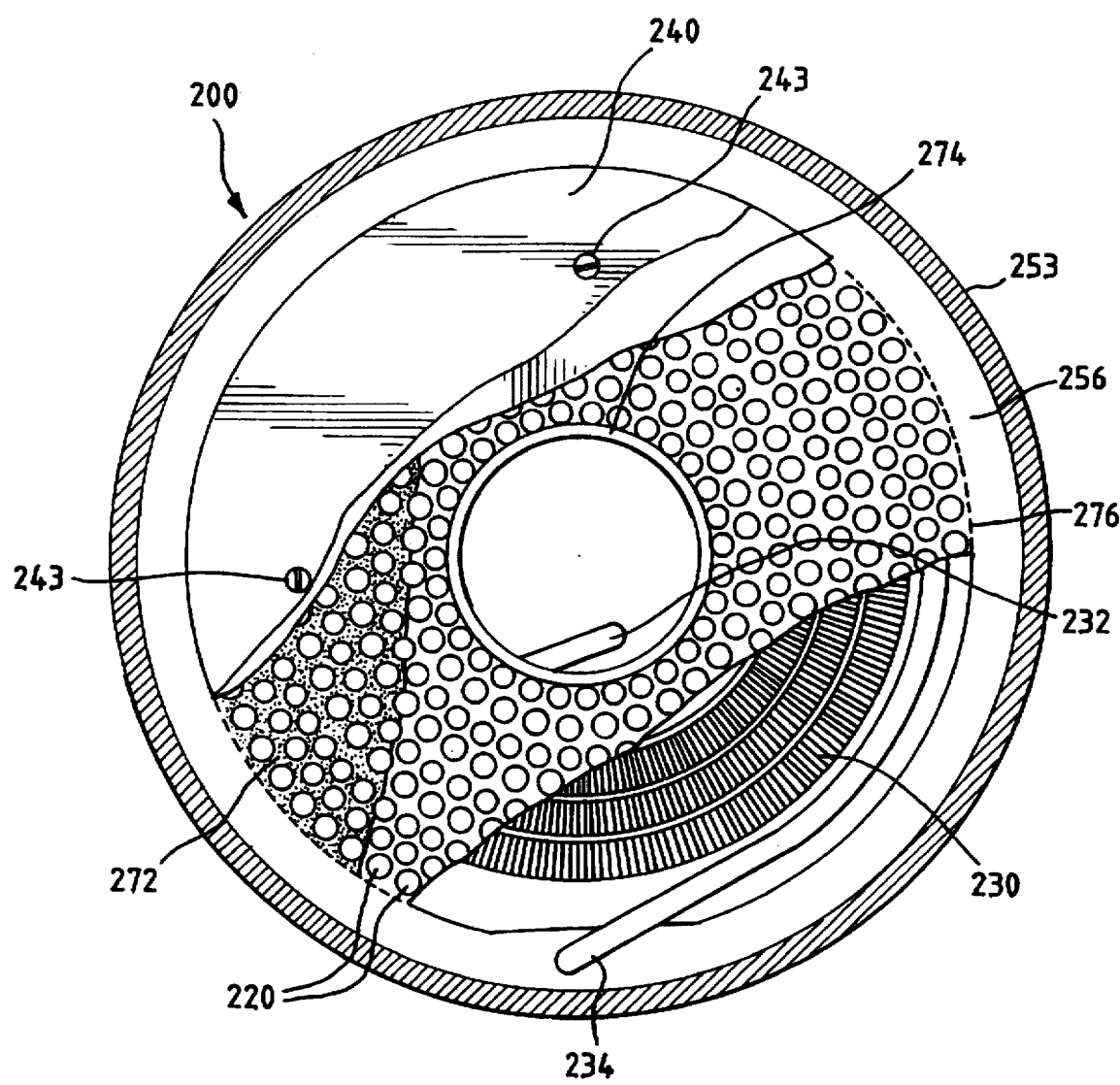
FIG. 3 is a top sectional view of the radial flow reactor illustrated in FIG. 2.

Turning now to FIG. 2 and 3, a radial flow reactor 200 includes a heat transfer assembly 210 and a reactor housing 250 encasing the heat transfer assembly 210. Heat transfer assembly 210 includes a heat transfer plate 212 having two oppositely facing major surfaces 214, 216 and an opening 218 formed in the central portion thereof. Heat transfer plate major surface 214 has a plurality of heat transfer structures 220 extending therefrom. Heat transfer plate major surface 216 has a plurality of heat transfer structures 221 extending therefrom.

In reactor 200, the pluralities of heat transfer structures 220, 221 are arranged in pluralities of concentric circular rows. Each or both of the pluralities of heat transfer structures 220, 221 could also be arranged in a spiral pattern. Preferably there is no radial, straight-line path between the heat transfer structures. In FIGS. 2 and 3, the pluralities of heat transfer structures 220, 221 are pluralities of cylindrical pins. The pluralities of heat transfer structures 220, 221 could also be pluralities of fins.

A fluid passageway 230 extends within heat transfer plate 212 in the volume between surfaces 214, 216. The passageway 230 includes an inlet 232 for introducing a heat transfer fluid stream into passageway 230 and an outlet 234 for directing the heat transfer fluid stream away from the passageway 230. Depending on the direction of reactant flow and the temperature profile required, the heat transfer fluid may be introduced into passageway 230 via outlet 234 and directed away from passageway 230 via inlet 232. Passageway 230 is preferably a coiled tube cast in place within the volume between major surfaces 214, 216 of heat transfer plate 212.

As shown in FIGS. 2 and 3, a first sealing plate 240 has two oppositely facing major surfaces 242, 244. First sealing plate major surface 242 contacts at least a portion of the plurality of heat transfer structures 220. A second sealing plate 237 has two oppositely facing major surfaces 239, 241. Second sealing plate major surface 239 contacts at least a portion of the plurality of heat transfer structures 221. First and second sealing plates 237, 240 are assembled to heat transfer assembly 210 by fasteners, shown in FIG. 2 as screws 243, 245, respectively. First sealing plate 240 and heat transfer assembly 210 cooperate to form a reaction chambers 246, 247 therebetween. Second sealing plate 237 and heat transfer assembly 210 cooperate to form a reaction chamber 247 therebetween.

Reactor housing 250 encases the heat transfer assembly 210. Reactor housing 250, as shown in FIGS. 2 and 3, includes an end plate 251 and a bell-shaped cover 253, but housing 250 could also be formed by interposing a cylindrical shell between two end plates. Reactor housing 250 includes a reactant stream inlet 252 and a reactant stream outlet 254.

Reactor 200 includes a conduit 262 in fluid communication with the heat transfer plate opening 218. Conduit 262 directs a reactant stream introduced at reactant stream inlet 252 to reaction chambers 246, 247. Conduit 262 fluidly interconnects reactant stream inlet 252 and reaction chambers 246, 247. The volume 256 formed between the reactor housing 250 and the heat transfer assembly 210 directs the reactant stream from the reaction chambers 246, 247 to the reactant stream outlet 254. Volume 256 fluidly interconnects the reaction chambers 246, 247 and the reactant stream outlet 254.

The radial flow of the reactant stream through reactor 200 can also be reversed from that described above. In reverse mode, the reactant stream is introduced at reactant stream outlet 254 and directed to reaction chambers 246, 247 by the volume 256 formed between reactor housing 250 and heat transfer assembly 210. The reactant stream is then directed from reaction chambers 246, 247 to reactant stream inlet 252 by conduit 262, which is in fluid communication with heat transfer plate opening 218.

When reactor 200 is employed to facilitate a catalytic reaction, such as, for example, steam reformation of a fuel like methanol, then reaction chambers 246, 247 are preferably filled with a quantity of catalyst, shown in FIGS. 2 and 3 as catalyst pellets 272. As shown in FIG. 3, an inner mesh screen 274 and an outer mesh screen 276 are employed to contain the catalyst pellets 272 within the reaction chambers. Catalyst pellets of different sizes may be used within the same reaction chamber to give the desired reactivity and fluid flow pattern. Further, baffles may be employed within the reaction chambers to control the flow path of the reactant stream through the chamber.

In operation, a reactant stream introduced to reactor 200 through reactant stream inlet 252 and conduit 262 (or, in reverse mode, through reactant stream outlet 254 and volume 256) flows through reaction chambers 246, 247. Reaction chambers 246, 247 are heated or cooled through exchange of heat with the plurality of heat transfer structures 220, 221, which are themselves heated or cooled by transfer of heat with a thermal fluid flowing in passageway 230. Once the reactant stream has participated in the physical or chemical process within reaction chambers 246, 247, the reactant stream is exhausted from reactor 200 through volume 256 and reactant stream outlet 254 (or, in reverse mode, through conduit 262 and reactant stream inlet 252).

Figure 4:
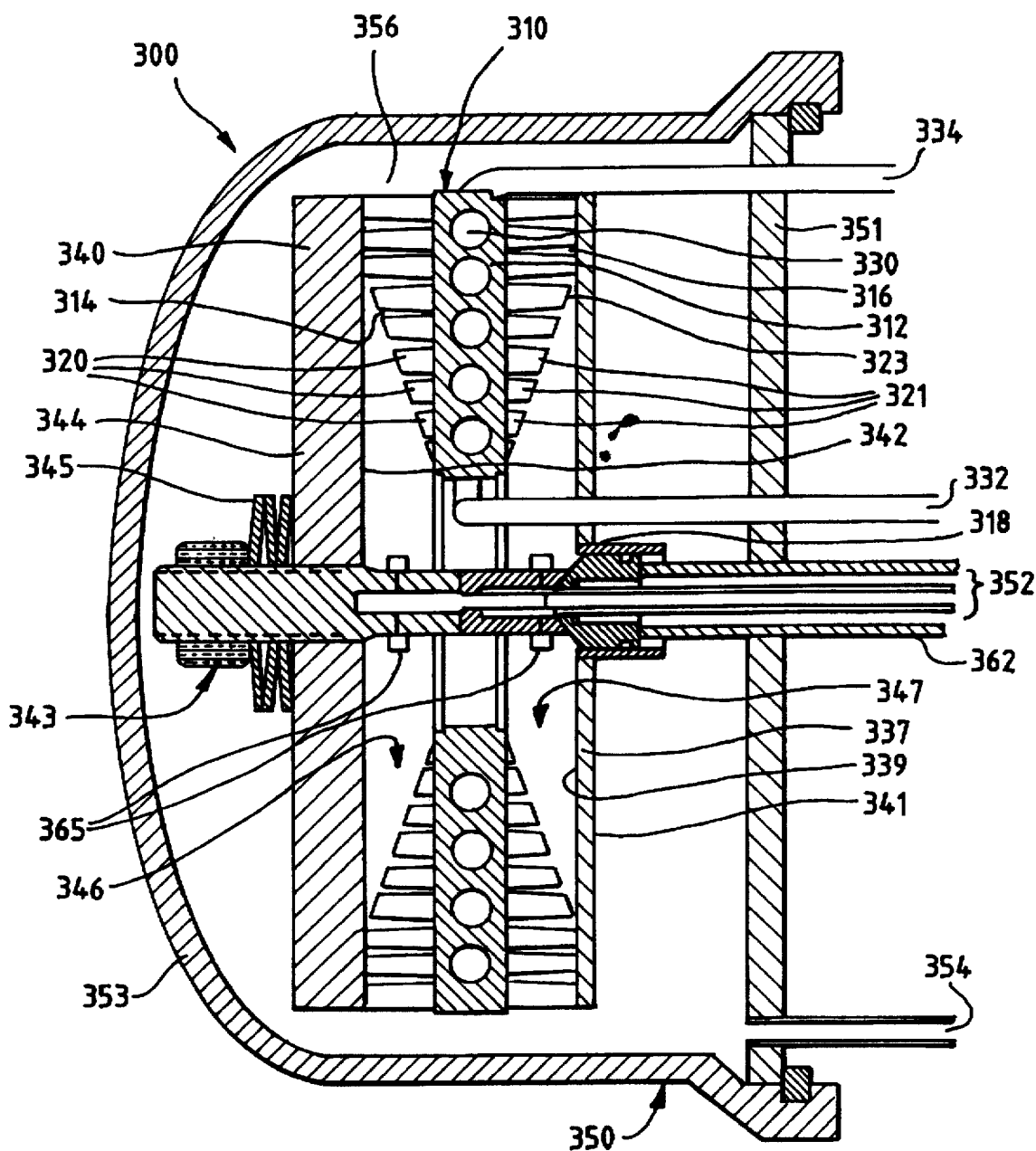
FIG. 4 is a side sectional view of a first embodiment of a radial flow vaporizer.
Figure 5:
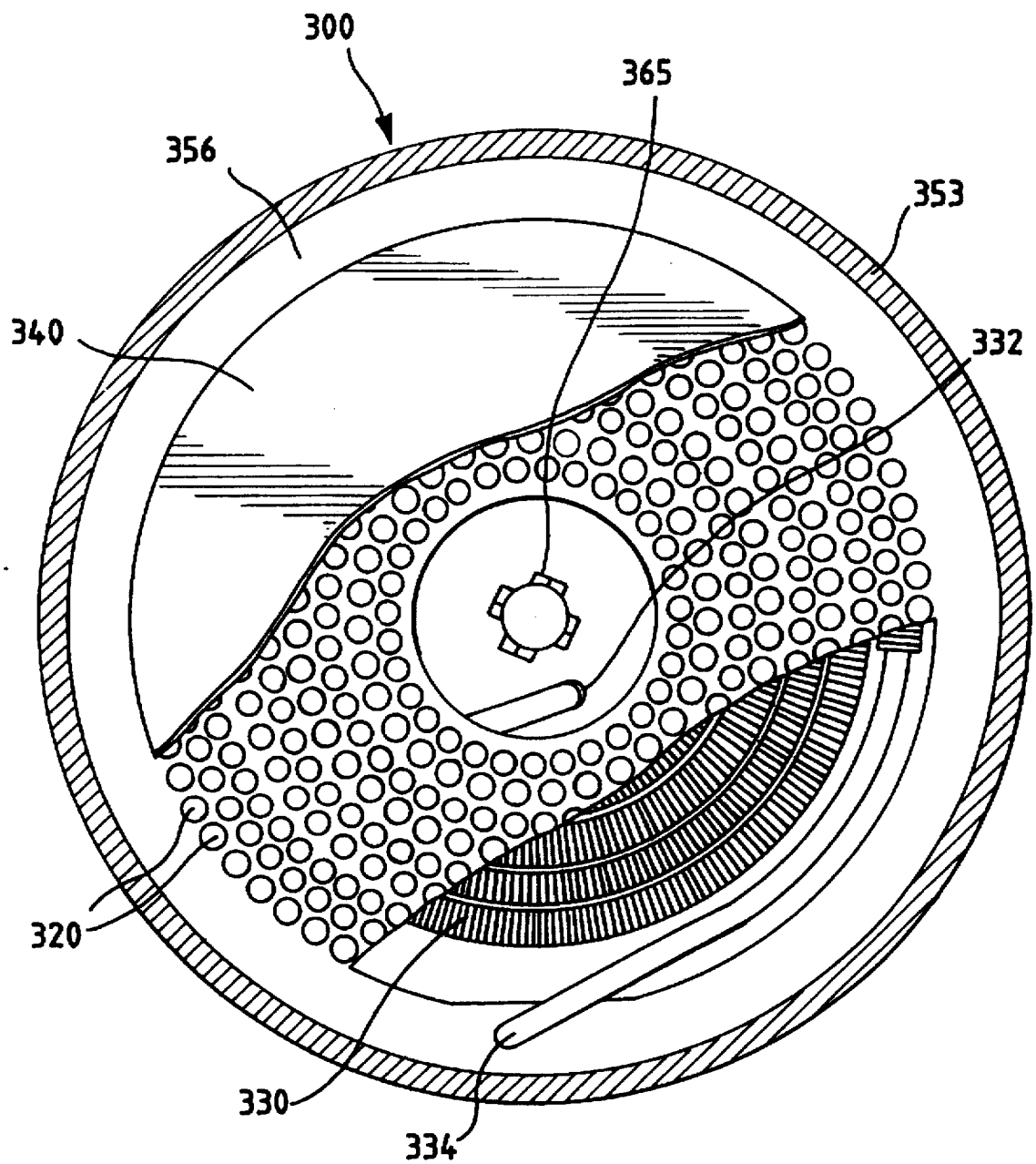
FIG. 5 is a top sectional view of the radial flow vaporizer illustrated in FIG. 4.

Turning now to FIGS. 4 and 5, a radial flow vaporizer 300 includes a heat transfer assembly 310 and a vaporizer housing 350. Heat transfer assembly 310 includes a heat transfer plate 312 having two oppositely facing major surfaces 314, 316 and an opening 318 formed in the central portion thereof. Each of heat transfer plate major surfaces 314, 316 has a plurality of heat transfer structures 320, 321, respectively, extending therefrom.

In vaporizer 300, the plurality of heat transfer structures 320 is arranged in a plurality of concentric circular rows. As shown in FIG. 4, each of the heat transfer structures 320, 321 has a distal edge 323, and the distance between distal edge 323 and heat transfer plate 312 increases as the plurality of concentric circular rows is traversed radially outwardly from the central portion of heat transfer plate 312. The pluralities of heat transfer structures 320, 321 could also be arranged in a spiral pattern. Preferably there is no radial, straight-line path between the heat transfer structures. In FIGS. 4 and 5, the plurality of heat transfer structures 320 is a plurality of cylindrical pins. The plurality of heat transfer structures 320 could also be a plurality of fins.

A fluid passageway 330 extends within heat transfer plate 312 in the volume between major surfaces 314, 316. Passageway 330 includes an inlet 332 for introducing a heat transfer fluid stream into passageway 330 and an outlet 334 for directing the heat transfer fluid stream away from passageway 330. Passageway 330 is preferably a coiled tube cast in place within the volume between major surfaces 314, 316 of heat transfer plate 312.

As shown in FIG. 4, a first sealing plate 340 has two oppositely facing major surfaces 342, 344. First sealing plate major surface 342 contacts at least a portion of the plurality of heat transfer structures 320 extending from the first heat transfer plate major surface 314. First sealing plate 340 and heat transfer assembly 310 cooperate to form a first vaporization chamber 346 therebetween.

A second sealing plate 337 has two oppositely facing major surfaces 339, 341. Second sealing plate major surface 339 contacts at least a portion of the plurality of heat transfer structures 321 extending from second heat transfer plate major surface 316. Second sealing plate 337 and heat transfer assembly 310 cooperate to form a second vaporization chamber 347 therebetween.

First and second sealing plates 340, 337 are assembled to heat transfer assembly 310 by a compression mechanism 343, which includes disc-springs 345 (Belleville washers).

The arrangement of the heat transfer pins 320 in concentric circular rows assures that a reactant stream flowing radially within vaporization chambers 346, 347 contacts at least one heat transfer pin before exiting vaporization chambers 346, 347. Moreover, the gradually increasing distance between the distal edge 323 and heat transfer plate 312 as the plurality of concentric circular rows is traversed radially outwardly from the central portion of heat transfer plate 312 assures that the reactant stream contacts a large surface area of the heat transfer structures and is rapidly vaporized. The gradual increase of the distance between the distal edge 323 of the heat transfer pins 320 and heat transfer plate 312 is preferred. The variation of that distance could also be configured differently depending upon the operating conditions of the vaporizer.

Vaporizer housing 350 encases the heat transfer assembly 310. Vaporizer housing 350, as shown in FIGS. 4 and 5, includes an end plate 351 and a bell-shaped cover 353, but housing 350 could also be formed by interposing a cylindrical shell between two end plates. Vaporizer housing 350 includes a reactant stream inlet 352 and a reactant stream outlet 354.

Vaporizer 300 includes a conduit 362 in fluid communication with the heat transfer plate opening 318. Conduit 362 directs a reactant stream introduced at reactant stream inlet 352 to reaction chambers 346, 347. Conduit 362 includes a plurality of nozzles 365 for introducing the reactant stream as an atomized mist into vaporization chambers 346, 347. Conduit 362 fluidly interconnects reactant stream inlet 352 and vaporization chambers 346, 347. The volume 356 formed between the vaporizer housing 350 and the heat transfer assembly 310 directs the reactants stream from the vaporization chambers 346, 347 to the reactant stream outlet 354. Volume 356 fluidly interconnects the vaporization chambers 346, 347 and the reactant stream outlet 354.

In operation, a reactant stream introduced to vaporizer 300 through reactant stream inlet 352 and conduit 362 flows through vaporization chambers 346, 347. Vaporization chambers 346, 347 are heated or cooled through exchange of heat with the plurality of heat transfer structures 320, 321, which are themselves heated or cooled by transfer of heat with a thermal fluid flowing in passageway 330. Once the reactant stream has participated in the vaporization process within vaporization chambers 346, 347, the reactant stream is exhausted from vaporizer 300 through volume 356 and reactant stream outlet 354.

Figure 6:
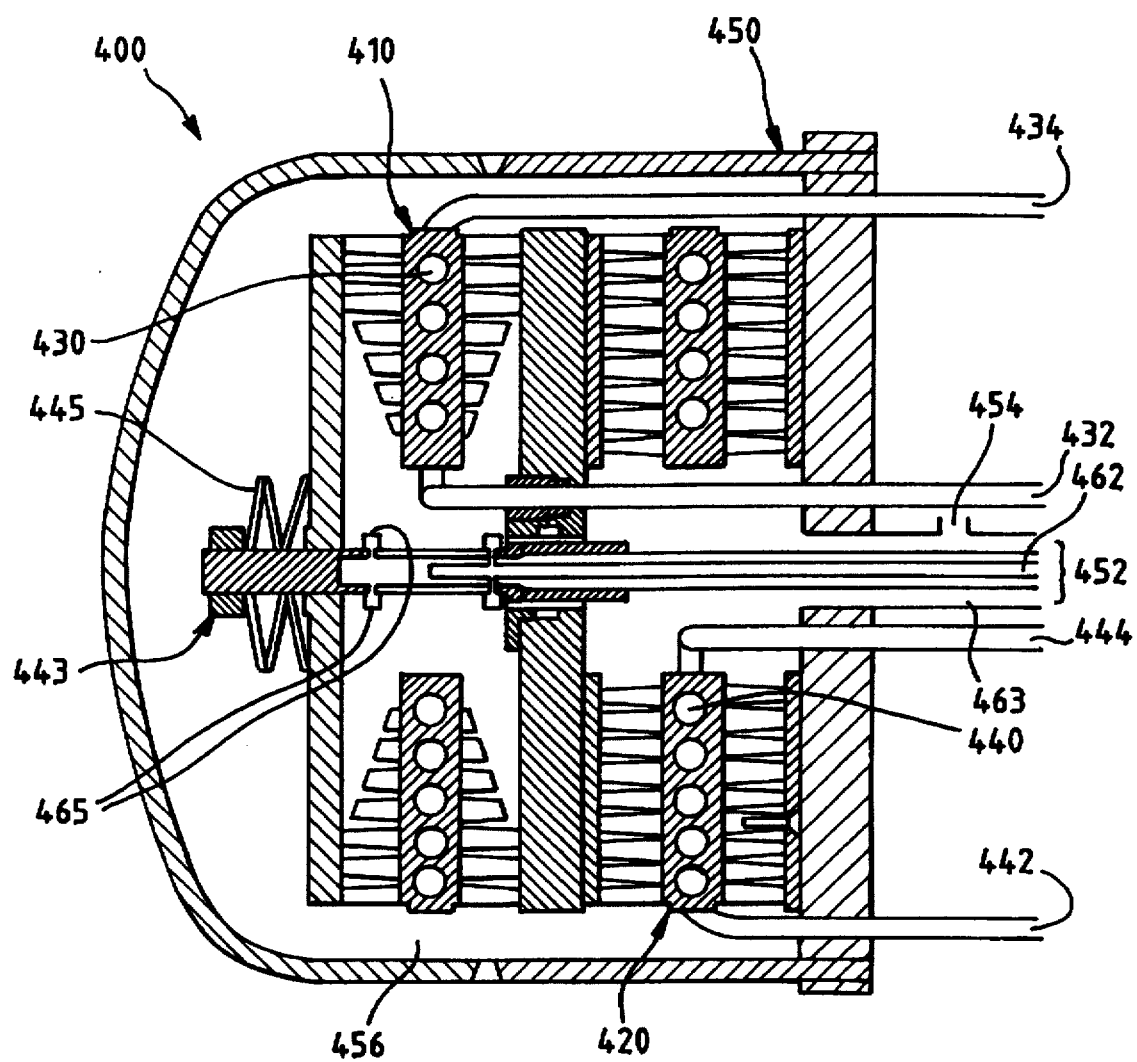
FIG. 6 is a side sectional view of a first embodiment of a radial flow fuel processor which includes a radial flow vaporizer and a radial flow reactor disposed within a processor housing.

Turning now to FIG. 6, a radial flow reactant processor 400 comprises a vaporizer heat transfer assembly 410, a reactor heat transfer assembly 420, and a processor housing 450.

Vaporizer heat transfer assembly 410 is substantially identical to vaporizer heat transfer assembly 310 in FIGS. 4 and 5. A fluid passageway 430 extends within vaporizer heat transfer assembly 410 and includes an inlet 432 for introducing a heat transfer fluid stream into passageway 430 and an outlet 434 for directing the heat transfer fluid stream away from the passageway 430. Passageway 430 is preferably a coiled tube cast in place within vaporizer heat transfer assembly 410.

Reactor heat transfer assembly 420 is substantially identical to reactor heat transfer assembly 210 in FIGS. 2 and 3. A fluid passageway 440 extends within vaporizer heat transfer assembly 420 and includes an inlet 442 for introducing a heat transfer fluid stream into passageway 440 and an outlet 444 for directing the heat transfer fluid stream away from the passageway 440. Passageway 440 is preferably a coiled tube cast in place within reactor heat transfer assembly 420.

Processor housing 450 encases vaporizer heat transfer assembly 410 and reactor heat transfer assembly 420. Processor housing 450 includes a reactant stream inlet 452 and a reactant stream outlet 454.

Vaporizer heat transfer assembly 410 and reactor heat transfer assembly 420 are assembled together by a compression mechanism 443, which includes disc-springs 445 (belleville washers).

A first conduit 462 directs a reactant stream introduced at reactant stream inlet 452 to the vaporization chambers of vaporizer heat transfer assembly 410. First conduit 462 preferably includes a plurality of nozzles 465 for introducing the reactant stream into the vaporization chambers. The volume 456 formed between processor housing 450 and vaporizer and reactor heat transfer assemblies 410, 420 directs the reactant stream from the vaporization chambers of vaporizer heat transfer assembly 410 to the reaction chambers of reactor heat transfer assembly 420. A second conduit 463 directs the reactant stream from the reaction chambers of reactor heat transfer assembly 420 to reactant stream outlet 454. First and second conduits 462, 463 are preferably concentrically disposed.

Figure 7:
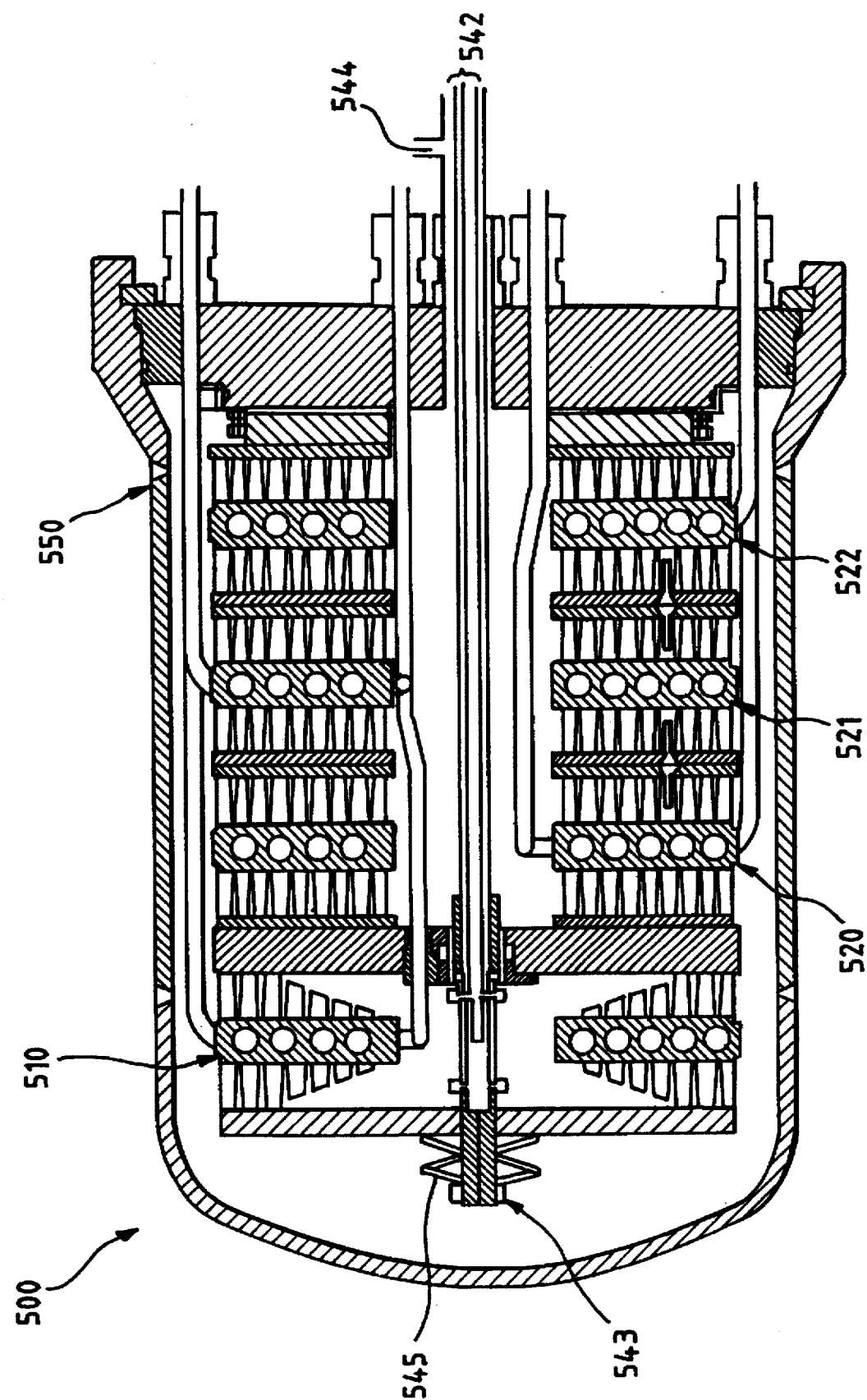
FIG. 7 is a side sectional view of a second embodiment of a radial flow fuel processor which includes a radial flow vaporizer and multiple radial flow reactor portions disposed within a single housing.

Turning now to FIG. 7, a radial flow reactant processor 500 comprises a vaporizer heat transfer assembly 510, a plurality of reactor heat transfer assemblies 520, 521, 522 and a processor housing 550.

Vaporizer heat transfer assembly 510 is substantially identical to vaporizer heat transfer assembly 410 in FIG. 6. Reactor heat transfer assemblies 520, 521, 522 are substantially identical to reactor heat transfer assembly 420 in FIG. 6. Vaporizer heat transfer assembly 510 and reactor heat transfer assemblies 520, 521 and 522 are assembled together by a compression mechanism 543, which includes disc-springs 545 (belleville washers). Processor housing 550 encases vaporizer heat transfer assembly 510 and reactor heat transfer assemblies 520, 521, 522, and includes a reactant stream inlet 542 and a reactant stream outlet 544.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A radial flow reactor comprising:
   (a) a heat transfer assembly comprising:
      (1) a heat transfer plate having two oppositely facing major surfaces and an opening formed in a central portion thereof, at least one of said heat transfer plate major surfaces having a plurality of heat transfer structures extending therefrom, and at least one fluid passageway extending within said heat transfer plate in the volume between said two major surfaces, said at least one passageway comprising an inlet for introducing a heat transfer fluid stream into said passageway and an outlet for directing said heat transfer fluid stream away from said passageway; and
      (2) a sealing plate having two oppositely facing major surfaces, one of said sealing plate major surfaces contacting at least a portion of said plurality of heat transfer structures, said sealing plate and said heat transfer plate cooperating to form a reaction chamber therebetween;
   (b) a reactor housing encasing said heat transfer assembly, said reactor housing comprising a reactant stream inlet and a reactant stream outlet;
   (c) means for directing a reactant stream introduced at said reactant stream inlet to said reaction chamber; and
   (d) means for directing said reactant stream from said reaction chamber to said reactant stream outlet.

2. The reactor of claim 1, wherein said means for directing a reactant stream introduced at said reactant stream inlet to said reaction chamber is a conduit in fluid communication with said heat transfer plate opening, said conduit fluidly interconnecting said reactant stream inlet and said reaction chamber, and wherein said means for directing said reactant stream from said reaction chamber to said reactant stream outlet is the volume formed between said reactor housing and said heat transfer assembly, said volume fluidly interconnecting said reaction chamber and said reactant stream outlet.

3. The reactor of claim 1, wherein said means for directing a reactant stream introduced at said reactant stream inlet to said reaction chamber is the volume formed between said reactor housing and said heat transfer assembly, said volume fluidly interconnecting said reactant stream inlet and said reaction chamber, and wherein said means for directing said reactant stream from said reaction chamber to said reactant stream outlet is a conduit in fluid communication with said heat transfer plate opening, said conduit fluidly interconnecting said reaction chamber and said reactant stream outlet.

4. The reactor of claim 1, wherein said plurality of heat transfer structures is arranged in a plurality of concentric circular rows.

5. The reactor of claim 1, wherein said plurality of heat transfer structures is arranged in a spiral pattern.

6. The reactor of claim 1, wherein said plurality of heat transfer structures comprises a plurality of cylindrical pins.

7. The reactor of claim 1, wherein said plurality of heat transfer structures comprises a plurality of fins.

8. The reactor of claim 1, wherein said at least one fluid passageway comprises a coiled tube.

9. The reactor of claim 1 further comprising a quantity of catalyst disposed within said reaction chamber.

10. The reactor of claim 9, wherein said catalyst promotes steam reformation of a fuel.

11. A radial flow reactor comprising:
   (a) a heat transfer assembly comprising:
      (1) a heat transfer plate having oppositely facing first and second major surfaces and an opening formed in a central portion thereof, each of said first and second heat transfer plate major surfaces having a plurality of heat transfer structures extending therefrom, at least one fluid passageway extending within said heat transfer plate in the volume between said two major surfaces, said at least one fluid passageway comprising an inlet for introducing a heat transfer fluid stream into said passageway and an outlet for directing said heat transfer fluid stream away from said passageway; and
      (2) a first sealing plate having two oppositely facing major surfaces, one of said first sealing plate major surfaces contacting at least a portion of said plurality of heat transfer structures extending from said first heat transfer plate major surface, said first sealing plate and said heat transfer plate cooperating to form a first reaction chamber therebetween;
      (3) a second sealing plate having two oppositely facing major surfaces, one of said second sealing plate major surfaces contacting at least a portion of said plurality of heat transfer structures extending from said second heat transfer plate major surface, said second sealing plate and said heat transfer plate cooperating to form a second reaction chamber therebetween;
   (b) a reactor housing encasing said heat transfer assembly, said reactor housing comprising a reactant stream inlet and a reactant stream outlet;
   (c) means for directing a reactant stream introduced at said reactant stream inlet to each of said first and second reaction chambers; and
   (d) means for directing said reactant stream from each of said first and second reaction chambers to said reactant stream outlet.

12. The reactor of claim 11, wherein said means for directing a reactant stream introduced at said reactant stream inlet to said first and second reaction chambers is a conduit in fluid communication with said heat transfer plate opening, said conduit fluidly interconnecting said reactant stream inlet and said first and second reaction chambers, and wherein said means for directing said reactant stream from said first and second reaction chambers to said reactant stream outlet is the volume formed between said reactor housing and said heat transfer assembly, said volume fluidly interconnecting said first and second reaction chambers and said reactant stream outlet.

13. The reactor of claim 11, wherein said means for directing a reactant stream introduced at said reactant stream inlet to said first and second reaction chambers is the volume formed between said reactor housing and said heat transfer assembly, said volume fluidly interconnecting said reactant stream inlet and said first and second reaction chambers, and wherein said means for directing said reactant stream from said first and second reaction chambers to said reactant stream outlet is a conduit in fluid communication with said heat transfer plate opening, said conduit fluidly interconnecting said first and second reaction chambers and said reactant stream outlet.

14. The reactor of claim 11, wherein said plurality of heat transfer structures is arranged in a plurality of concentric circular rows.

15. The reactor of claim 11, wherein said plurality of heat transfer structures is arranged in a spiral pattern.

16. The reactor of claim 11, wherein said plurality of heat transfer structures comprises a plurality of cylindrical pins.

17. The reactor of claim 11, wherein said plurality of heat transfer structures comprises a plurality of fins.

18. The reactor of claim 11, wherein said at least one fluid passageway comprises a coiled tube.

19. The reactor of claim 11 further comprising a quantity of catalyst disposed within at least one of said first and second reaction chambers.

20. The reactor of claim 19, wherein said catalyst promotes steam reformation of a fuel.

21. A radial flow vaporizer comprising:
 (a) a heat transfer assembly comprising:
  (1) a heat transfer plate having two oppositely facing major surfaces and an opening formed in a central portion thereof, at least one of said heat transfer plate major surfaces having a plurality of heat transfer structures extending therefrom, at least one fluid passageway extending within said heat transfer plate in the volume between said two major surfaces, said at least one fluid passageway comprising an inlet for introducing a heat transfer fluid stream into said passageway and an outlet for directing said heat transfer fluid stream away from said passageway; and
  (2) a sealing plate having two oppositely facing major surfaces, one of said sealing plate major surfaces contacting at least a portion of said plurality of heat transfer structures, said sealing plate and said heat transfer plate cooperating to form a vaporization chamber therebetween;
 (b) a vaporizer housing encasing said heat transfer assembly, said vaporizer housing comprising a reactant stream inlet and a reactant stream outlet;
 (c) means for directing a reactant stream introduced at said reactant stream inlet to said vaporization chamber; and
 (d) means for directing said reactant stream from said vaporization chamber to said reactant stream outlet.

22. The vaporizer of claim 21, wherein said means for directing a reactant stream introduced at said reactant stream inlet to said vaporization chamber is a conduit in fluid communication with said heat transfer plate opening, said conduit fluidly interconnecting said reactant stream inlet and said vaporization chamber, and wherein said means for directing said reactant stream from said vaporization chamber to said reactant stream outlet is the volume formed between said vaporizer housing and said heat transfer assembly, said volume fluidly interconnecting said vaporization chamber and said reactant stream outlet.

23. The vaporizer of claim 22, wherein said conduit comprises a plurality of nozzles for introducing said reactant stream into said vaporization chamber.

24. The vaporizer of claim 21, wherein said plurality of heat transfer structures is arranged in a plurality of concentric circular rows.

25. The vaporizer of claim 24, wherein each of said plurality of heat transfer structures has a distal edge, the distance between said distal edge and said heat transfer plate increasing as said plurality of concentric circular rows is traversed radially outwardly from said central portion of said heat transfer plate.

26. The vaporizer of claim 21, wherein said plurality of heat transfer structures is arranged in a spiral pattern.

27. The vaporizer of claim 21, wherein said plurality of heat transfer structures comprises a plurality of pins.

28. The vaporizer of claim 21, wherein said plurality of heat transfer structures comprises a plurality of fins.

29. The vaporizer of claim 21, wherein said at least one fluid passageway comprises a coiled tube.

30. A radial flow vaporizer comprising:
 (a) a heat transfer assembly comprising:
  (1) a heat transfer plate having oppositely facing first and second major surfaces and an opening formed in a central portion thereof, each of said first and second heat transfer plate major surfaces having a plurality of heat transfer structures extending therefrom, at least one fluid passageway extending within said heat transfer plate in the volume between said two major surfaces, said at least one fluid passageway comprising an inlet for introducing a heat transfer fluid stream into said passageway and an outlet for directing said heat transfer fluid stream away from said passageway; and
  (2) a first sealing plate having two oppositely facing major surfaces, one of said first sealing plate major surfaces contacting at least a portion of said plurality of heat transfer structures extending from said first heat transfer plate major surface, said first sealing plate and said heat transfer plate cooperating to form a first vaporization chamber therebetween;
  (3) a second sealing plate having two oppositely facing major surfaces, one of said second sealing plate major surfaces contacting at least a portion of said plurality of heat transfer structures extending from said second heat transfer plate major surface, said second sealing plate and said heat transfer plate cooperating to form a second vaporization chamber therebetween;
 (b) a vaporizer housing encasing said heat transfer assembly, said vaporizer housing comprising a reactant stream inlet and a reactant stream outlet;
 (c) means for directing a reactant stream introduced at said reactant stream inlet to each of said first and second vaporization chambers; and
 (d) means for directing said reactant stream from each of said first and second vaporization chambers to said reactant stream outlet.

31. The vaporizer of claim 30, wherein said means for directing a reactant stream introduced at said reactant stream inlet to said first and second vaporization chambers is a conduit in fluid communication with said heat transfer plate opening, said conduit fluidly interconnecting said reactant stream inlet and said first and second vaporization chambers, and wherein said means for directing said reactant stream from said first and second vaporization chambers to said reactant stream outlet is the volume formed between said vaporizer housing and said heat transfer assembly, said volume fluidly interconnecting said first and second vaporization chambers and said reactant stream outlet.

32. The vaporizer of claim 31, wherein said conduit comprises a plurality of nozzles for introducing said reactant stream into said first and second vaporization chambers.

33. The vaporizer of claim 30, wherein said plurality of heat transfer structures is arranged in a plurality of concentric circular rows.

34. The vaporizer of claim 33, wherein each of said plurality of heat transfer structures has a distal edge, the distance between said distal edge and said heat transfer plate increasing as said plurality of concentric circular rows is traversed radially outwardly from said central portion of said heat transfer plate.

35. The vaporizer of claim 30, wherein said plurality of pins is arranged in a spiral pattern.

36. The vaporizer of claim 30, wherein said plurality of heat transfer structures comprises a plurality of pins.

37. The vaporizer of claim 30, wherein said plurality of heat transfer structures comprises a plurality of fins.

38. The vaporizer of claim 30, wherein said at least one fluid passageway comprises a coiled tube.

39. A radial flow reactant processor comprising:
  (a) a vaporizer heat transfer assembly comprising:
    (1) a vaporizer heat transfer plate having two oppositely facing major surfaces and an opening formed in a central portion thereof, at least one of said vaporizer heat transfer plate major surfaces having a plurality of vaporizer heat transfer structures extending therefrom, at least one vaporizer fluid passageway extending within said vaporizer heat transfer plate in the volume between said two vaporizer heat transfer plate major surfaces, said at least one vaporizer fluid passageway comprising an inlet for introducing a heat transfer fluid stream into said vaporizer fluid passageway and an outlet for directing said heat transfer fluid stream away from said vaporizer fluid passageway; and
    (2) a vaporizer sealing plate having two oppositely facing major surfaces, one of said vaporizer sealing plate major surfaces contacting at least a portion of said plurality of vaporizer heat transfer structures, said vaporizer sealing plate and said vaporizer heat transfer plate cooperating to form a vaporization chamber therebetween;
  (b) a reactor heat transfer assembly comprising:
    (1) a reactor heat transfer plate having two oppositely facing major surfaces and an opening formed in the central portion thereof, at least one of said reactor heat transfer plate major surfaces having a plurality of reactor heat transfer structures extending therefrom, at least one reactor fluid passageway extending within said reactor heat transfer plate in the volume between said two reactor heat transfer plate major surfaces, said at least one reactor fluid passageway comprising an inlet for introducing a heat transfer fluid stream into said reactor fluid passageway and an outlet for directing said heat transfer fluid stream away from said reactor fluid passageway; and
    (2) a reactor sealing plate having two oppositely facing major surfaces, one of said reactor sealing plate major surfaces contacting at least a portion of said plurality of reactor heat transfer structures, said reactor sealing plate and said reactor heat transfer plate cooperating to form a reaction chamber therebetween;
  (c) a processor housing encasing said vaporizer heat transfer assembly and said reactor heat transfer assembly, said processor housing comprising a reactant stream inlet and a reactant stream outlet;
  (d) means for directing a reactant stream introduced at said reactant stream inlet to said vaporization chamber;
  (e) means for directing said reactant stream from said vaporization chamber to said reaction chamber;
  (f) means for directing said reactant stream from said reaction chamber to said reactant stream outlet.

40. The reactant processor of claim 39, wherein said means for directing a reactant stream introduced at said reactant stream inlet to said vaporization chamber is a first conduit extending through said vaporizer heat transfer plate opening and said reactor heat transfer plate opening, said conduit fluidly interconnecting said reactant stream inlet and said vaporization chamber, wherein said means for directing said reactant stream from said vaporization chamber to said reaction chamber is the volume formed between said processor housing and said vaporizer and reactor heat transfer assemblies, said volume fluidly interconnecting said vaporization chamber and said reaction chamber, and wherein said means for directing said reactant stream from said reaction chamber to said reactant stream outlet is a second conduit extending through said vaporizer heat transfer plate opening and said reactor heat transfer plate opening, said second conduit fluidly interconnecting said reaction chamber and said reactant stream outlet.

41. The reactant processor of claim 40, wherein said first and second conduits are concentrically disposed.

42. The reactant processor of claim 41, wherein said first conduit is disposed within said second conduit and wherein said first conduit comprises a plurality of nozzles for introducing said reactant stream into said vaporization chamber.

43. The reactant processor of claim 39, wherein said plurality of vaporizer heat transfer structures is arranged in a plurality of concentric circular rows and said plurality of reactor heat transfer structures is arranged in a plurality of concentric circular rows.

44. The reactant processor of claim 43, wherein each of said plurality of vaporizer heat transfer structures has a distal edge, the distance between said distal edge and said vaporizer heat transfer plate increasing as said plurality of vaporizer concentric circular rows are traversed radially outwardly from said central portion of said vaporizer heat transfer plate.

45. The reactant processor of claim 39, wherein said plurality of vaporizer heat transfer structures is arranged in a spiral pattern and said plurality of reactor heat transfer structures is arranged in a spiral pattern.

46. The reactant processor of claim 39, wherein said plurality of vaporizer heat transfer structures comprises a plurality of pins and said plurality of reactor heat transfer structures comprises a plurality of pins.

47. The reactant processor of claim 39, wherein said at least one vaporizer fluid passageway comprises a coiled tube and said at least one reactor fluid passageway comprises a coiled tube.

48. The reactant processor of claim 39 further comprising a quantity of catalyst disposed within said reaction chamber.

49. The reactant processor of claim 48, wherein said catalyst promotes steam reformation of a fuel.

50. A radial flow reactant processor comprising:
  (a) at least one vaporizer heat transfer assembly comprising:
    (1) a vaporizer heat transfer plate having oppositely facing first and second major surfaces and an opening formed in a central portion thereof, each of said first and second vaporizer heat transfer plate major surfaces having a plurality of vaporizer heat transfer structures extending therefrom, at least one vaporizer fluid passageway extending within said vaporizer heat transfer plate in the volume between said two vaporizer heat transfer plate major surfaces, said at least one vaporizer fluid passageway comprising an inlet for introducing a heat transfer fluid stream into said passageway and an outlet for directing said heat transfer fluid stream away from said vaporizer fluid passageway; and (2) a first vaporizer sealing plate having two oppositely facing major surfaces, one of said first vaporizer sealing plate major surfaces contacting at least a portion of said plurality of vaporizer heat transfer structures extending from said first vaporizer heat transfer plate major surface, said first vaporizer sealing plate and said at least one vaporizer heat transfer plate cooperating to form a first vaporization chamber therebetween;

(3) a second vaporizer sealing plate having two oppositely facing major surfaces, one of said second sealing plate major surfaces contacting at least a portion of said plurality of heat transfer structures extending from said second heat transfer plate major surface, said second sealing plate and said heat transfer plate cooperating to form a second vaporization chamber therebetween;

(b) at least one reactor heat transfer assembly comprising:
(1) a reactor heat transfer plate having oppositely facing first and second major surfaces and an opening formed in the central portion thereof, each of said first and second reactor heat transfer plate major surfaces having a plurality of reactor heat transfer structures extending therefrom, at least one reactor fluid passageway extending within said reactor heat transfer plate in the volume between said two major reactor heat transfer plate surfaces, said at least one reactor fluid passageway comprising an inlet for introducing a heat transfer fluid stream into said passageway and an outlet for directing said heat transfer fluid stream away from said reactor fluid passageway; and (2) a first reactor sealing plate having two oppositely facing major surfaces, one of said first reactor sealing plate major surfaces contacting at least a portion of said plurality of reactor heat transfer structures extending from said first reactor heat transfer plate major surface, said first reactor sealing plate and said at least one reactor heat transfer plate cooperating to form a first reaction chamber therebetween;

(3) a second reactor sealing plate having two oppositely facing major surfaces, one of said second reactor sealing plate major surfaces contacting at least a portion of said plurality of reactor heat transfer structures extending from said second reactor heat transfer plate major surface, said second reactor sealing plate and said at least one reactor heat transfer plate cooperating to form a second reaction chamber therebetween;

(c) a processor housing encasing said at least one vaporizer heat transfer assembly and said at least one reactor heat transfer assembly, said processor housing comprising a reactant stream inlet and a reactant stream outlet;

(d) means for directing a reactant stream introduced at said reactant stream inlet to said first and second vaporization chambers;

(e) means for directing said reactant stream from said first and second vaporization chambers to said first and second reaction chambers;

(f) means for directing said reactant stream from said first and second reaction chambers to said reactant stream outlet.

51. The reactant processor of claim 50, wherein said means for directing a reactant stream introduced at said reactant stream inlet to said first and second vaporization chambers is a first conduit extending through said vaporizer heat transfer plate opening and said reactor heat transfer plate opening, said conduit fluidly interconnecting said reactant stream inlet and said first and second vaporization chambers, wherein said means for directing said reactant stream from said first and second vaporization chambers to said first and second reaction chambers is the volume formed between said processor housing and said vaporizer and reactor heat transfer assemblies, said volume fluidly interconnecting said first and second vaporization chambers and said first and second reaction chambers, and wherein said means for directing said reactant stream from said first and second reaction chambers to said reactant stream outlet is a second conduit extending through said vaporizer heat transfer plate opening and said reactor heat transfer plate opening, said second conduit fluidly interconnecting said first and second reaction chambers and said reactant stream outlet.

52. The reactant processor of claim 51, wherein said first and second conduits are concentrically disposed.

53. The reactant processor of claim 52, wherein said first conduit is disposed within said second conduit and wherein said first conduit comprises a plurality of nozzles for introducing said reactant stream into said first and second vaporization chambers.

54. The reactant processor of claim 50, wherein said plurality of vaporizer heat transfer structures is arranged in a plurality of concentric circular rows and said plurality of reactor heat transfer structures is arranged in a plurality of concentric circular rows.

55. The reactant processor of claim 54, wherein each of said plurality of vaporizer heat transfer structures has a distal edge, the distance between said distal edge and said vaporizer heat transfer plate increasing as said plurality of vaporizer concentric circular rows are traversed radially outwardly from said central portion of said vaporizer heat transfer plate.

56. The reactant processor of claim 50, wherein said plurality of vaporizer heat transfer structures is arranged in a spiral pattern and said plurality of reactor heat transfer structures is arranged in a spiral pattern.

57. The reactant processor of claim 50, wherein said plurality of vaporizer heat transfer structures comprises a plurality of pins and said plurality of reactor heat transfer structures comprises a plurality of pins.

58. The reactant processor of claim 50, wherein said at least one vaporizer fluid passageway comprises a coiled tube and said at least one reactor fluid passageway comprises a coiled tube.

59. The reactant processor of claim 50 further comprising a quantity of catalyst disposed within at least one of said first and second reaction chambers.

60. The reactant processor of claim 59, wherein said catalyst promotes steam reformation of a fuel.

61. The reactant processor of claim 50, wherein said at least one vaporizer heat transfer assembly is one vaporizer heat transfer assembly and said at least one reactor heat transfer assembly comprises a plurality of reactor heat transfer assemblies.

* * * * *